Patented Mar. 15, 1927.

1,620,873

UNITED STATES PATENT OFFICE.

NIELS C. CHRISTENSEN, OF SALT LAKE CITY, UTAH.

PROCESS OF TREATING SULPHIDE ORES OF LEAD AND ZINC.

No Drawing.  Application filed December 26, 1923. Serial No. 682,832.

This process relates to the treatment of ores and concentrates, containing lead sulphide and mixtures of lead sulphide with zinc sulphide. It has for its object the separation of the lead from these ores and particularly from the zinc sulphide. As described in my patent application 330,320, now Patent Number 1,539,713 issued May 26, 1925, a hot concentrated chloride brine (such as sodium chloride or calcium chloride) containing acid in the proper proportion (either sulphuric or hydrochloric, preferably the latter) will dissolve the lead sulphide in a lead-zinc sulphide mixture, leaving the greater part of the zinc undissolved, providing that an excess of acid is not used. The lead may then be recovered from the brine by cooling and precipitating the lead as a chloride. With some ores and concentrates, however, it is not possible to recover much of the lead by cooling, owing to the small percentage of lead in the material treated, and in other cases a considerable part of the zinc is dissolved by the hot solution. The heating of the solution is therefore of no advantage in the first case mentioned and is disadvantageous in the second case mentioned. I have found that it is not necessary to heat the acid chloride solution in order to dissolve the lead sulphide, providing that a sufficient volume of solution is used to hold the lead chloride in solution and that sufficient time is allowed for the acid brine to act on the galena. The cold brine is saturated by a much smaller proportion of lead chloride than the hot brine. Therefore a larger volume of solution must be used. The action of the hot acid brine is very rapid while the action of the cold is slow, requiring considerable longer time to secure the same results.

The time of treatment necessary to dissolve practically all of the lead with the cold acid brine depends upon the fineness of grinding. With very fine grinding, a treatment of one hour is sufficient in most cases, the necessary time increasing considerably with coarse grinding. An important part of the treatment with cold brine is the manner in which the operation is carried out. I have found that unless the hydrogen sulphide, generated in the process, is allowed to escape, the action of the cold acid brine on the galena becomes very slow and practically ceases after a time. A hot solution will not hold much hydrogen sulphide in solution, and this gas can be driven from a hot solution rapidly by slight agitation or boiling. With a cold solution, however, provision must be made for the driving off the hydrogen sulphide, owing to the slower action of the cold acid brine and the repression of this action due to the stronger hydrogen sulphide solution formed.

I have therefore found that it is very advantageous to thoroughly agitate the mixture of cold acid brine and ore, so as to allow as free an escape as possible for the hydrogen sulphide, and still more advantageous to aerate or pass air through the mixture during the agitation so as to drive off the hydrogen sulphide, and thereby increase the rapidity of the action on the galena. By this method of treatment with a cold acid brine, the necessity of heating the solution is avoided and in the case of some ores and concentrates, less zinc is dissolved than is the case with the hot brine. The importance of both of these advantages will be apparent without additional discussion.

By this method of treatment with cold acid brine practically all the lead may be removed from a zinc sulphide ore or concentrate. As is well known to metallurgists, the separation of the lead from the zinc in mixed sulphide ores is a step of great importance, as there are no known methods of smelting or otherwise treating the mixed ores without loss of one or the other valuable metal constituents, and in many cases the direct treatment of the mixture is economically impossible by the present known methods. It will thus be apparent that my method of separation is an important step in the art of treating such ores.

The lead may be recovered from the cold brine used in my process by a number of different methods, such as precipitation by electrolysis preferably with an iron anode but my preferred method is described in my applications Nos. 682,831 and 683,823 now Patent Numbers 1,549,062, issued August 11, 1925 and 1,572,268 issued February 10, 1926, respectively. This method consists in separating the brine containing the lead chloride from the treated ore or concentrate and precipitating the lead as a sulphide by means of a calcium sulphide compound which is made by the absorption in lime or calcium hydrate of the hydrogen sulphide given off during the treatment of ore with the acid brine, thus forming calcium sulphide or preferably calcium sulphhydrate. This method of precipitation is fully described in the patent applications given above.

It is of course, obvious that my process is not limited to the treatment of zinc-lead sulphide ores, but is applicable to treatment of any ores containing galena or lead sulphide.

By the term "cold" used in the specifications and claims, as describing the temperature of the operation, I mean ordinary temperature as distinguished from heated, that is, hot solutions.

Having described my process what I claim is:

1. The process of treating ores and the like containing galena which consists in mixing said ores with a cold acid brine and thoroughly agitating said mixture so as to liberate the $H_2S$ therefrom, and thereby dissolving the lead out of said ores.

2. The process of treating ores and the like containing lead sulphide which consists in mixing said ores with a cold acid brine and agitating and aerating said mixture and thereby dissolving the lead out of said ores.

3. The process of treating mixed lead-zinc sulphide ores and concentrates which consists in dissolving the lead out of said ores with a cold brine containing acid in such proportion as to dissolve only a relatively small part of the zinc in said ore.

4. The process of treating ores and the like containing lead and zinc sulphides which consists in agitating said ores with a cold acid brine solution and thereby dissolving the lead out of said ores and leaving the greater part of the zinc sulphide undissolved.

5. The process of treating ores and the like containing lead and zinc sulphides which consists in mixing said ores with a cold acid brine solution and agitating and aerating said mixture and thereby dissolving the lead out of said ores and leaving the greater part of the zinc sulphide undissolved.

NIELS C. CHRISTENSEN.